Aug. 9, 1949.                J. K. BAIR                2,478,174
                HIGH IMPEDANCE VACUUM TUBE VOLTMETER
                      Filed Sept. 21, 1945
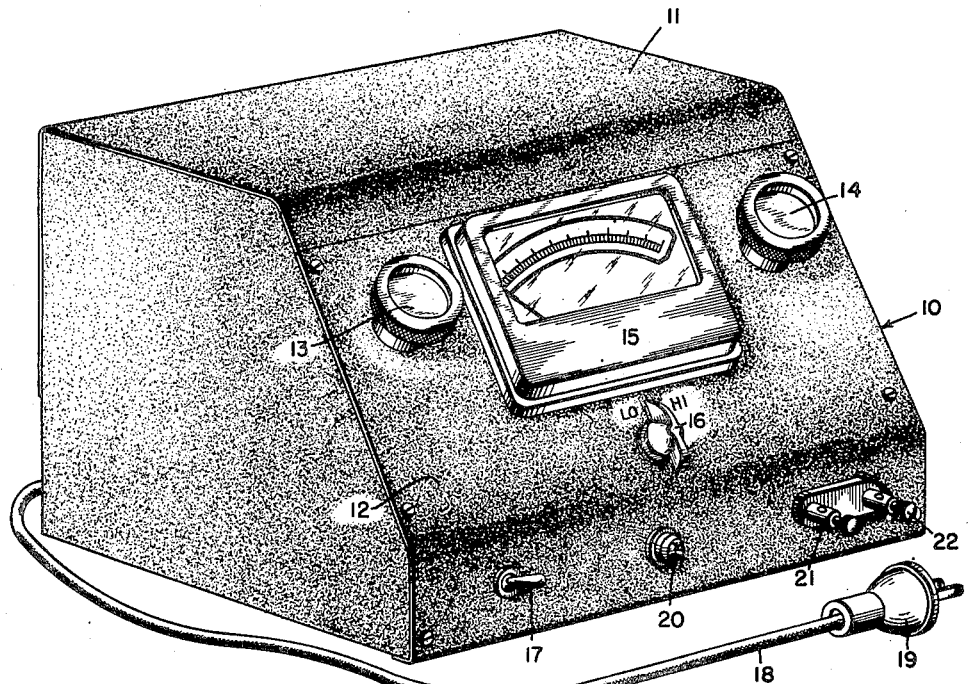
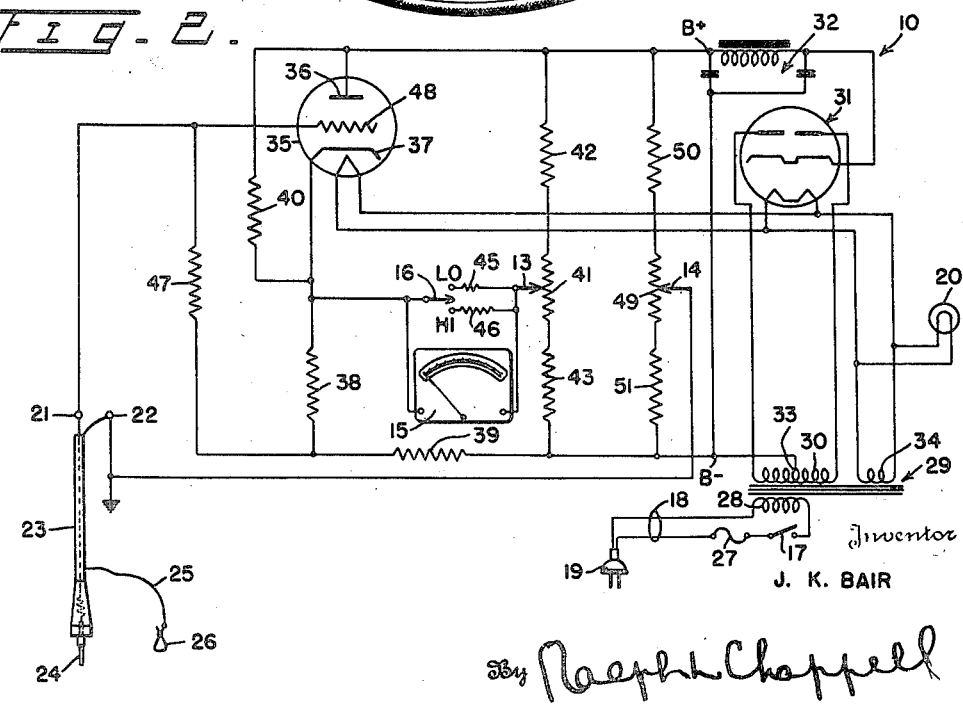
Inventor
J. K. BAIR
By Ralph L. Chappell
            Attorney Patented Aug. 9, 1949

2,478,174

UNITED STATES PATENT OFFICE 2,478,174

HIGH IMPEDANCE VACUUM TUBE
VOLTMETER

Joe K. Bair, Washington, D. C.

Application September 21, 1945, Serial No. 617,895

8 Claims. (Cl. 171—95)

(Granted under the act of March 3, 1883, as
amended April 30, 1928; 370 O. G. 757)

This invention relates to vacuum tube voltmeters and more particularly to a vacuum tube voltmeter which presents a relatively high impedance input to voltage sources to be measured thereby.

Electronic circuits such, for example, as mine and depth charge firing control circuits, frequently employ high impedance voltage sources and it has been found difficult in many cases to obtain true and accurate measurements of the electromotive forces provided thereby for the reason that the meters heretofore available for the purpose generally have presented relatively low input impedances to the voltage sources under test.

An object of the present invention therefore is to provide a new and improved vacuum tube voltmeter which presents a relatively high input impedance to the voltage source to be measured thereby.

Another object is to provide a vacuum tube voltmeter having a grid leak which is so arranged with respect to its associated circuit elements that the input of the meter presents an apparent impedance which is many times the actual value of the grid leak.

Another object is to provide a portable vacuum tube voltmeter which may employ a battery as its source of power, or alternatively, conveniently may be arranged to draw its power from a commercial A. C. power line.

A further object is to provide a vacuum tube voltmeter which is so arranged as to employ degeneration for the purpose of stabilizing the operation of the meter in response to the usual power source variations and changes in the characteristics of the vacuum tubes employed, thereby to insure permanency of calibration and stability under varying conditions of operation.

An additional object resides in the provision of a vacuum tube voltmeter having electronic circuits which are relatively simple in construction and operation.

Still another object is to provide a vaccum tube voltmeter which readily may be calibrated and arranged to provide a plurality of ranges of voltages which may be measured thereby.

Still other objects, features and advantages of the present invention are those implied from or inherent in the novel circuit arrangements as will become more clearly apparent as the description proceeds, reference being had to the accompanying drawings wherein:

Fig. 1 is a perspective view of a portable vacuum tube voltmeter constructed in accordance with a preferred embodiment of the invention; and Fig. 2 is a diagrammatic view of a complete electrical circuit suitable for use with the vacuum tube meter shown in Fig. 1.

Referring now to the drawings for a more complete understanding of the invention, and more particularly to Fig. 1 thereof, the numeral 10 generally designates a vacuum tube voltmeter which comprises a plurality of vacuum tubes and associated circuit elements. The tubes and circuit elements preferably are contained within a suitable case 11 and may be arranged and mounted therein in any suitable manner. The container preferably is formed of metal, or any suitable substitute therefor, and may be constructed in any suitable manner according to the needs of the voltmeter. Voltmeter 10, for example, preferably is provided with a removable panel 12 upon which is mounted an indicating meter 15 which indicates the values of the voltage sources measured. Also supported on the panel are a pair of adjusting knobs 13 and 14 adapted to control the adjustment of a pair of potentiometers or adjustable resistors individual thereto and employed for the purpose of setting the zero position of meter 15. The panel further has mounted thereon an adjustment knob 16 for selecting one or the other of a pair of ranges of voltages which conveniently may be indicated by meter 15, the meter for this purpose being provided with a pair of calibrated scales, if desired, or a calibrating chart may be used in connection therewith.

A power switch 17 is employed to connect the voltmeter 10 to a suitable source of A. C. power by way of a conventional cord 18 and plug 19 secured thereto, a pilot lamp 20 being employed to indicate when power is being received by the voltmeter 10. A pair of input terminals 21 and 22, one of which is grounded to the case 11, preferably are used with a probe 23, Fig. 2, having a highly insulated electrode 24 and having a grounded outer conductor 25 to the end of which is secured a suitable clamp 26.

Referring now to Fig. 2, it will be seen that the power supplied by way of plug 19 and cord 18 preferably passes through a conventional fuse 27 and switch 17 to the primary winding 28 of a suitable power transformer generally designated 29. The secondary winding 30 of the transformer is arranged to supply power to a conventional full wave rectifier 31 having an output circuit including a filter generally designated 32. The D. C. power source provided from the rectifier output is designated B+—B− and follows an obvious path from the filter to a center tap 33 of secondary winding 30. It will be apparent that, if desired, a battery source readily may be substituted at B+—B- for the rectifier and its A. C. source. A low voltage secondary winding 34 is provided for supplying the heater of rectifier tube 31 and the heater of a conventional vacuum tube 35, pilot lamp 20 also preferably being supplied from the low voltage source.

The plate 36 of tube 35 is connected to the positive potential side B+ of the rectifier output at filter 32 and the cathode 37 of the tube is connected by way of series connected impedance elements or resistors 38 and 39 to the negative potential side B- of the rectifier at center tap 33. The operating point of tube 35 is determined by the current which flows through tube 35 and impedance element or resistor 40 in parallel therewith and thence flows through resistors 38 and 39.

Tube 35 and resistors 38 and 39, together with a potentiometer 41 connected in series with resistors 42 and 43 across the D. C. source, comprise a bridge circuit across the output of which meter 15 is connected. Resistors 45 and 46 selectively are adapted to be shunted across the meter by adjustment of a switch 16 and are employed to adjust the sensitivity of the meter 15 and thereby provide different voltage ranges which voltmeter 10 is adapted to measure. Knob 13, which controls the wiper of potentiometer 41, is adjusted to balance the bridge and thereby set the zero position of meter 15 when the input terminals 21 and 22 of the voltmeter are open.

A grid leak 47 is interconnected between grid 48 of the tube 35 and the junction of resistors 38 and 39. A second potentiometer 49 is connected in series with resistors 50 and 51 across the D. C. power supply, the wiper of potentiometer 49 being controlled by knob 14 and electrically connected to the low potential one of terminals 21 and 22, the grid 48 being connected to the high potential one of the terminals. It will be understood that, in use, electrode 24 of probe 23 is connected to the high potential side of the voltage source under test and clamp 26 is connected to any convenient low potential point of the source.

The input terminals 21 and 22 have connected thereacross a resistance network including in series resistors 47, 39, and 51 and a portion of potentiometer 49 as determined by the adjustment of knob 14. The voltage drop developed across resistor 39, however, is in opposition to the voltage drop developed across resistor 51 and the aforesaid portion of potentiometer 49. With the terminals shortcircuited, the adjusting knob 14 is adjusted such that these voltage drops are equal, and the meter 15 reads zero. If these voltages are not made equal the voltage difference whether positive or negative would appear as a signal on the grid when the input terminals are short circuited, and this signal would be manifested by a reading on the meter other than zero. The meter reading thus obtained would be added or subtracted, as the case may be, from every other reading and cause all readings to be erroneous. When the voltage source to be measured is applied to input terminals 21 and 22 with positive polarity applied to terminal 21, a voltage equal to part of that applied to the grid 48 of vacuum tube 35 appears across resistor 39 due to current flow therethrough from the tube. This voltage is opposite in polarity to that of the source being measured and is connected in series with it. Thus, the voltage appearing across resistor 47 is less than that of the source and hence the current drawn by resistor 47 from the source is less than that which would be drawn by resistor 47 if it were connected directly across terminals 21 and 22. Thus, the circuit parameters may be selected such that the apparent input impedance of voltmeter 10 may be made many times greater than the actual or physical value of resistor 47.

It will be noted that resistor 38 provides current feedback and that resistor 39 provides voltage feedback which tend to increase the stability of the instrument and the permanency of calibration. Thus degenerative effects are obtained in the operation of the voltmeter which compensate for voltage variations in the power source and for changes in the operating characteristics of the vacuum tubes due to ageing thereof, such compensating and stabilizing operations being in accordance with well known theories of operation of electronic circuits of this type.

From the foregoing, operation of the voltmeter in use should now be apparent, it being understood that the voltmeter first be calibrated by applying a number of known voltages to the input thereof and marking the scales of meter 15 is accordance with the voltage values applied for both settings of the range adjusting knob 16 and/or by preparing a suitable calibrating chart for use with meter 15.

From the foregoing it should now be apparent that a vacuum tube voltmeter has been provided which is well adapted to fulfill the aforestated objects of the invention. Moreover, it will be understood by those skilled in the art to which the invention apertains that variations in the circuit arrangement and in the choice of circuit elements employed may be made without departing from the spirit and scope of the invention as defined by the appended claims.

The invention herein described and claimed may be manufactured and used by or for the Government of the United States of America for governmental purposes without the payment of any royalties thereon or therefor.

What is claimed as new and desired to be secured by Letters Patent of the United States is:

1. In a vacuum tube voltmeter of the character disclosed, the combination of a source of D. C. power, an electron discharge device having a plate, cathode and control grid, said plate being connected to the high potential side of said source of power, a first impedance element connected between said cathode and the low potential side of the source of power, a second impedance element connected between the cathode and said control grid, a source of electromotive force having a voltage equal in value to the voltage drop appearing across said first impedance element when the input to the voltmeter is shorted, said source of electromotive force being connected on one side thereof to the junction of the first impedance element and the low potential side of the source of power such that the source of electromotive force is connected in series opposition to the voltage appearing across the first impedance element, a high impedance input circuit including one terminal connected to the control grid and a second terminal connected to the other side of the source of electromotive force, and means responsive to variations in the space current of the electron discharge device as different voltages are selectively applied to the input of the voltmeter for indicating the values of such voltages.

2. In a vacuum tube voltmeter of the character disclosed, the combination of a source of D. C. power, an electron discharge device having a plate, cathode and control grid, said plate being connected to the high potential side of said source of power, first and second impedance elements connected in series between said cathode and the low potential side of the source of power in the order named, a third impedance element connected between the junction of said series connected impedance elements and said control grid, a source of electromotive force having a voltage equal in value to the voltage drop appearing across said second impedance element when the input to the voltmeter is shorted, said source of electromotive force being connected on one side thereof to the junction of the second impedance element and the low potential side of the source of power such that the source of electromotive force is connected in series opposition to the voltage appearing across the second impedance element, a high impedance input circuit including one terminal connected to the control grid and a second terminal connected to the other end of the source of electromotive force, and means responsive to variations in the space current of the electron discharge device as different voltages are selectively applied to the input of the voltmeter for indicating the values of such voltages.

3. In a vacuum tube voltmeter of the character disclosed, the combination of a source of D. C. power, an electron discharge device having a plate, cathode and control grid, said plate being connected to the high potential side of said source of power, first and second impedance elements connected in series between said cathode and the low potential side of the source of power in the order named, a third impedance element connected between the junction of said series connected impedance elements and said control grid, a voltage divider network connected across the source of power, a high impedance input circuit for the voltmeter including a first terminal connected to a predetermined point in said voltage divider network and a second terminal connected to the control grid, and means responsive to variations in the space current of the electron discharge device as different voltages are selectively applied to the input of the voltmeter for indicating the values of such voltages.

4. In a vacuum tube voltmeter of the character disclosed, the combination of a source of D. C. power, an electron discharge device having a plate, cathode and control grid, said plate being connected to the high potential side of said source of power, first and second impedance elements connected in series between said cathode and the low potential side of the source of power in the order named, a third impedance element connected between the junction of said series connected impedance elements and said control grid, first and second voltage divider networks connected across the source of power, a high impedance input circuit for the voltmeter including a first terminal connected to a predetermined point in said first voltage divider network and a second terminal connected to the control grid, and an indicating meter connected between the cathode circuit and a predetermined point in said second voltage divider network and calibrated to indicate the value of voltages selectively applied to the input of the voltmeter.

5. In a vacuum tube voltmeter of the character disclosed, the combination of a source of D. C. power, an electron discharge device having a plate, cathode and control grid, said plate being connected to the high potential side of said source of power, first and second impedance elements connected in series between said cathode and the low potential side of the source of power in the order named, a third impedance element connected between the junction of said series connected impedance elements and said control grid, a fourth impedance element connected between the cathode and the plate, first and second voltage divider networks connected across the source of power and each having an adjustable impedance element, a high impedance input circuit for the voltmeter including a first terminal connected to the adjustable impedance element of the first voltage divider network and a second terminal connected to the control grid, and an indicating meter connected between the cathode and the adjustable impedance element of the second voltage divider network and calibrated to indicate the value of voltages selectively applied to the input of the voltmeter.

6. In a vacuum tube voltmeter of the character disclosed, the combination of a source of D. C. power, an electron discharge device having a plate, cathode and control grid, said plate being connected to the high potential side of said source of power, first and second impedance elements connected in series between said cathode and the low potential side of the source of power in the order named, a third impedance element connected between the junction of said series connected impedance elements and said control grid, a fourth impedance element connected between the cathode and the plate, first and second voltage divider networks connected across the source of power and each having an adjustable impedance element, a high impedance input circuit for the voltmeter including a first terminal connected to the adjustable impedance element of the first voltage divider network and a second terminal connected to the control grid, an indicating meter connected between the cathode and the adjustable impedance element of the second voltage divider network and calibrated to indicate the value of voltages selectively applied to the input of the voltmeter, a plurality of resistors each connected on one end thereof to the adjustable impedance element of the second voltage divider network, and a multiposition switch adapted selectively to interconnect the other ends of the plurality of resistors with the cathode whereby the sensitivity of the indicating meter may be varied to provide a plurality of voltage ranges which may be measured by the voltmeter.

7. In a vacuum tube voltmeter, an electron discharge device having a grid, cathode, and anode; an input circuit connected to said grid; a bridge circuit including three resistance means and the anode-cathode path of said electron discharge device as the arms thereof; a source of D. C. potential connected across one diagonal of said bridge; an indicating meter connected across the other diagonal of said bridge; circuit means for applying at least a portion of the voltage developed across one of said resistance means to said input circuit in a direction to oppose the flow of current from the source to be measured into said input circuit; and means for introducing a second voltage into said input circuit opposite in polarity and substantially equal to the voltage drop across said last named resistance means when no voltage is applied to said input circuit from the source to be measured.

8. In a vacuum tube voltmeter of the character disclosed; an input circuit having connected in series across the terminals thereof a first resistance, a second resistance, and a third resistance; an electron discharge device having a grid, an anode, and a cathode; said first resistance being connected between said grid and cathode; a bridge circuit including said electron discharge device in one leg thereof and said second resistance in another leg thereof; said second resistance being in the anode-cathode path of said device whereby the discharge current therefrom flows through the second resistance, an indicating meter connected across one diagonal of said bridge; energizing means connected across the other diagonal of said bridge; and means including an element adjustable at will for developing a first voltage drop across said third resistance of a predetermined polarity; said second resistance being adapted to develop a second voltage drop thereacross opposite in polarity to said first voltage and opposing the voltage to be measured when said discharge current flows through said electron discharge device; said element being adjustable to a position for causing said first and second voltages to cancel in said input circuit when said input circuit has been shorted; said second voltage acting to reduce the flow of current in said input circuit from a source the voltage of which is to be measured as said discharge current is increased in response to the source voltage.

JOE K. BAIR.

REFERENCES CITED

The following references are of record in the file of this patent:

UNITED STATES PATENTS

| Number | Name | Date |
|---|---|---|
| 2,185,367 | Blumlein | Jan. 2, 1940 |
| 2,237,950 | Pineo | Apr. 8, 1941 |
| 2,305,307 | Wellenstein et al. | Dec. 15, 1942 |
| 2,356,733 | Banker | Aug. 29, 1944 |

FOREIGN PATENTS

| Number | Country | Date |
|---|---|---|
| 477,392 | Great Britain | Dec. 22, 1937 |

OTHER REFERENCES

Vacuum Tube Voltmeters, by J. F. Rider (1941), pages 55 to 57. (Copy in Div. 42.)